3,340,256
S-TETRAZINYL STABLE ORGANIC FREE
RADICAL COMPOUNDS
Richard Kuhn and Heinrich Trischmann, Heidelberg,
Germany, assignors to Badische Anilin- & Soda-Fabrik
Aktiengesellschaft, Ludwigshafen (Rhine), Germany
No Drawing. Filed Dec. 26, 1963, Ser. No. 333,752
Claims priority, application Germany, Dec. 29, 1962,
B 70,163; Mar. 23, 1963, B 71,277; July 20, 1963,
B 72,784
9 Claims. (Cl. 260—241)

This invention concerns new organic radical substances which are derived from formazans and processes for their production.

The object of this invention is the synthesis of new organic substances of the radical type. Substances of this nature are paramagnetic and, therefore, of great interest. A further object of the invention is to develop a new class of chemical compounds which may be used as starting materials for the production of dyes and therapeutic substances.

We have found that compounds of the said type are obtained in a remarkable reaction if N,N'-diarylformazans of the general Formula I

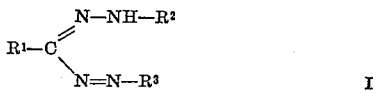

in which $R^1$ is hydrogen or an aliphatic, araliphatic or aromatic group and $R^2$ and $R^3$ are identical or different aromatic groups which may be substituted, are treated with aldehydes of the general Formula II

in which $R^4$ is hydrogen, an aliphatic or an araliphatic group, or with compounds which yield these aldehydes or if the N,N'-diarylformazans (I) are treated with alkylating or aralkylating agents of the general Formula III

in which X is a strong acid group, the resulting compounds being simultaneously or subsequently dehydrogenated.

The new compounds which have the general empirical formula $R^1R^2R^3R^4C_2HN_4$ have an intense green color. They are paramagnetic and have, therefore, the character of organic radical compounds. The constitution of these compounds has not been established with certainty, but investigations indicate that the formazan (I) forms a 6-membered heterocyclic ring (IV) with the compound II or III,

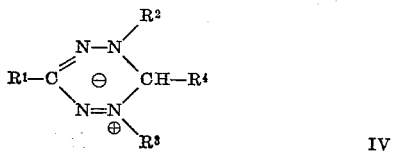

in which the position of the radical cannot be localized.

In the formazans of the general Formula I, $R^1$ can—for example—be hydrogen, an alkyl group such as the methyl or ethyl group, an aralkyl group such as the benzyl group or an aryl group such as the phenyl group, the methylphenyl or halophenyl groups or, for example, a cyano group, $R^2$ and $R^3$ can—for example—be phenyl groups, halophenyl and alkoxyphenyl groups.

Examples of such formazans are N,N'-diphenylformazan, N,N'-diphenylmethylformazan, N,N'-diphenylcyanoformazan, triphenylformazan and N-(o-methoxyphenyl)-N'-phenyl-C-phenylformazan.

Examples of aldehydes of the general Formula II are propionaldehyde, phenylacetaldehyde, acetaldehyde and formaldehyde together with derivatives of these compounds with aldehydic function, such as paraformaldehyde, 1,3,5-trioxan, paraldehyde and the aldehyde hydrates and acetals. Alkylidene and aralkylidene halides such as methylene iodide and benzal chloride can be included among derivatives with aldehydic function.

The reaction with the aldehydes is carried out preferably in homogeneous liquid phase. Suitable solvents are, for example, water, alcohols, glacial acetic acid and dimethylformamide. The reaction takes place at temperatures as low as −10° C. and also at temperatures up to approximately 120° C. The reaction should preferably be carried out at temperatures between 0 and 20° C.

The reaction proceeds both in acid and in alkaline medium. Suitable acids are, for example, glacial acetic acid, hydrochloric acid and sulfuric acid. The color of the reaction mixture becomes deeper as the reaction proceeds. The reaction mixture is then neutralized and treated with an excess of water which precipitates the reaction product.

Suitable bases are, for example, inorganic bases, such as sodium hydroxide, potassium hydroxide, sodium carbonate and ammonia and also organic bases, such as triethylamine, piperidine and pyridine. The use of a solvent and diluent is also recommended. The reaction is promoted markedly by the presence of molecular oxygen.

Suitable alkylating and aralkylating agents (III) are, for example, dimethyl sulfate, methyl iodide, benzyl bromide and p-bromo-benzyl bromide. The reaction is carried out preferably in a solvent such as dimethylformamide or dimethyl sulfoxide which is inert to alkylation and aralkylation. The reaction should be carried out preferably at a temperature between 0 and 20° C. although useful results are also obtained outside this temperature range.

The dehydrogenation is carried out with one of the usual agents, such as air or pure molecular oxygen. The dehydrogenation is promoted by passing in the gas in a stream or by shaking the reaction mixture in the presence of air or oxygen. Potassium ferricyanide is a further example of a dehydrogenating agent which may be used.

The compounds obtained by the process described can be recrystallized from hydrocarbons and are remarkably stable and resist, for example, the action of boiling alcoholic alkali and boiling glacial acetic acid. A marked change in color generally from green to violet takes place when the compounds pass from a neutral or alkaline medium into an acid medium.

The new compounds are suitable for use as acid-base indicators, oxidation inhibitors and as intermediates for organic syntheses.

*Example 1*

6 g. triphenylformazan is dissolved in 300 cc. dimethylformamide, the mixture cooled to 0° C. and treated with 30 g. barium oxide and 15 g. barium hydroxide octahydrate. A mixture of 45 cc. dimethyl sulfate and 45 cc. dimethylformamide is then added dropwise with vigorous stirring and with passage of a stream of oxygen. Half of the solution is added with about 10 minutes, the reaction mixture becoming dark green. The addition of the solution is completed within another 10 minutes after which 30 cc. concentrated ammonia is added dropwise, the mixture being cooled continuously with ice. The reaction mixture is allowed to stand for about 3 hours during which time the temperature is allowed to rise to 20° C. and then diluted with benzene. The benzene solution is washed with water until it is neutral and dried over sodium sulfate.

The solution is evaporated under reduced pressure yielding 6.3 g. of an oily residue which is dissolved in 60 cc. acetone and 200 cc. methanol and yields thick bluish black prisms. 5 g. of substance, M.P. 142–143° C. is thus obtained.

$C_{20}H_{17}N_4$(313.37).—Calc'd: C, 76.65; H, 5.47; N, 17.88. Found: C, 76.38; H, 5.30; N, 18.26.

The compound probably has the following formula:

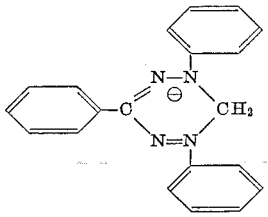

It forms a 1:1 molecular compound with 1,3,5-triphenyl benzene.

If a methanolic solution of silver nitrate is added to the green solution of the compound in acetone or benzene, then the green coloration of the solution changes to violet. The violet coloration is retained even after the addition of sodium acetate. The violate coloration produced by the addition of acids and resulting from the formation of a salt is not stable to alkalis; the solution of the salt becomes green if sodium acetate is added.

If hydrogen sulfide is passed at room temperature through the green solution of the compound in benzene, or through the violet solution in glacial acetic acid, then the solutions become colorless in a few minutes. The solution regains its original color if oxygen is passed in.

The oxygen absorption of benzaldehyde in the Warburg apparatus is reduced to ¼ of the aldehyde contains 0.2 mg. of the compound per cc. 1 mg. of the compound per cc. aldehyde inhibits the oxygen absorption almost completely.

Example 2

1.5 triphenylformazan is dissolved in 40 cc. of dimethylformamide, cooled to 0° C. and treated with 10 g. barium oxide and 5 g. barium hydroxide octahydrate with stirring and with passage of a stream of nitrogen. 15 cc. dimethyl sulfate is added slowly in the dark. The reaction mixture acquires an orange coloration. 10 cc. concentrated ammonia is added after 70 minutes with cooling. The mixture is stirred for approximately 2 hours in an atmosphere of nitrogen, diluted with water and extracted with benzene. The benzene solution is washed with water until it is neutral and the benzene solution then distilled to dryness at approximately 40° C. in an atmosphere of nitrogen. An orange colored oily residue is obtained which on trituration crystallizes in a yield of approximately 1.5 g. The crystalline product is washed with methanol, 1 g. orange platelets, M.P. 104–105° C. being obtained. The product is highly unstable in solution and is rapidly converted by air and light into the green compound obtained according to Example 1.

$C_{20}H_{18}N_4$(314.37).—Calc'd: C, 76.40; H, 5.77; N, 17.82. Found: C, 76.58; H, 5.90; N, 17.69.

Example 3

2 g. triphenylformazan is dissolved in 80 cc. dimethylformamide cooled to 0° C. and treated with 14 g. barium oxide and 700 mg. barium hydroxide octahydrate. 20 cc. benzyl bromide is run in slowly with stirring in the presence of air. The mixture acquires a brilliant green shade after 6 hours. The reaction mixture is dilute with benzene and the benzene solution washed with water until it is neutral and distilled to dryness at 12 mm. The residual benzyl bromide is distilled off at 1 mm. The oily residue is dissolved in methanol yielding 800 mg. green prisms, M.P. 180–181° C.

$C_{26}H_{21}N_4$(389.46).—Calc'd: C, 80.17; H, 5.48; N, 14.39. Found: C, 80.22; H, 5.39; N, 14.64.

Example 4

1 g. triphenylformazan is dissolved in 50 cc. dimethylformamide, cooled to 0° C. and treated with 7 g. barium oxide and 350 mg. barium hydroxide octahydrate. 4 g. p-bromobenzyl bromide is then added. The mixture acquires a vivid green color after 7 hours. The reaction mixture is diluted with benzene and the benzene solution washed with water until it is neutral.

The benzene solution is distilled to dryness under reduced pressure and the residue recrystallized from benzene-petroleum ether. The crystalline product is filtered at the pump and washed thoroughly with petroleum ether. Approximately 1 g. green prisms, M.P. 198–199° C., is obtained.

$C_{26}H_{20}N_4Br$ (468.37).—Calc'd: C, 66.66; H, 4.30; N, 11.96. Found: C, 67.21; H, 4.21; N, 11.80.

Example 5

A solution of 1 g. triphenylformazan in 100 cc. dimethylformamide is treated with 3 g. potassium bisulfate and 30 cc. 30% formaldehyde. The mixture is heated for about 2 minutes at 60° C. The dark red coloration of the solution changes to a deep violet coloration. The solution is treated with approximately 100 cc. water and 2 N caustic soda solution added until the solution is alkaline. A green crystalline precipitate is obtained and this is filtered at the pump, washed with water and dried yielding 1 g. substance, M.P. 140–141° C.

The infra-red spectrum of the substance obtained is identical with the infra-red spectrum of the compound obtained according to Example 1. The mixed melting point is 141–142° C.

The formula of the compound is assumed to be as follows:

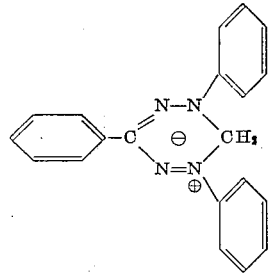

Example 6

6 g. triphenylformazan is dissolved in 600 ml. ethanol and the solution treated with 60 ml. 40% aqueous formaldehyde solution and 6 ml. 10 N hydrochloric acid. The reaction mixture is boiled under reflux for 20 minutes and then rendered alkaline with 10 ml. 25% ammonia which causes the color of the solution to change from violet to green. 500 ml. hot water is then added and the reaction product begins to crystallize out. The crystalline product is washed with approximately 50 ml. dilute alcohol and allowed to dry in the air.

A yield of 51% of a compound with the molecular formula $C_{20}H_{17}N_4$ is obtained.

Analysis of the compound gives the following values—Calc.d: C, 76.65; H, 5.47; N, 17.86. Found: C, 76.38; H, 5.3; N, 18.26; C, 76.40; H, 6.1; N, 17.30.

Example 7

A solution of 3 g. triphenylformazan, 2 ml. of 40% formaldehyde solution and 80 ml. glacial acetic acid is heated for a short period at 100° C. The solution acquires a violet coloration. It is cooled and treated with a mixture of 50 ml. 25% ammonia, 100 ml. water and 250 g. ice.

The product obtained as a precipitate is worked up as described in Example 6. The yield is 91%; the compound is identical with the compound obtained according to Example 5.

Example 8

1 g. triphenylformazan is allowed to stand for 1½ to 2 hours at 20° C. in 100 cc. dimethylformamide containing 10 g. potassium bisulfate and 25 cc. 30% formaldehyde.

The reaction mixture is treated with water and 2 N caustic soda. 1 g. of the radical, mixed melting point 140–141° C., is obtained.

Example 9

A solution of 3.5 g. N-(o-methoxyphenyl)-N'-phenyl-C-phenylformazan, 10 ml. 40% formaldehyde solution and 80 ml. glacial acetic acid is stirred for 30 minutes at 60° C. and treated as described in Example 6. The product is obtained in a yield of 93%.

Example 10

2 g. C.N.-dimethoxyphenyl-N'-phenylformazan is allowed to stand for 20 minutes in 300 cc. dimethylformamide containing 10 g. potassium bisulfate and 60 cc. 30% formaldehyde. The solution acquires a dark blue color. Ice and 2 N caustic soda are then added until the solution becomes green. 2 g. of a crystalline precipitate, readily soluble in acetone, is obtained. The precipitate is recrystallized from acetone by addition of methanol and a small amount of water. M.P. 146–147° C.

$C_{22}H_{21}Q_2N_4$ (373.41).—Calc'd: C, 70.75; H, 5.67; N, 15.0. Found: C, 10.60; H, 5.48; N, 14.95.

Example 11

2 g. triphenylformazan is dissolved in 150 ml. dimethylformamide and the solution treated with 10 ml. 40% aqueous formaldehyde solution and 10 ml. 2 N aqueous caustic soda. A stream of oxygen is then passed for 4 to 5 minutes through the solution which acquires a dark green color. The temperature of the solution is 20° C.

The reaction mixture is treated with 500 ml. water, the paramagnetic triphenylformazan derivative, molecular formula $C_{20}H_{17}N_4$, being precipitated in practically quantitative yield. The crude product melts at 138–139° C.; the pure product has a melting point of 141–142° C. The compound is identical with the compound obtained in Examples 1 and 5. The reaction can also be carried out by heating the solution for a short time at 50–55° C. Under these conditions the presence of oxygen is unnecessary.

We claim:

1. An organic radical compound of the formula:

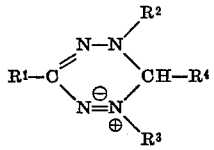

in which $R^1$ is selected from the group consisting of hydrogen, lower alkyl, phenyl, lower alkyl phenyl, halophenyl and benzyl; $R^2$ and $R^3$ are selected from the group consisting of phenyl, halophenyl and lower alkoxy phenyl and $R_4$ is selected from the group consisting of hydrogen, lower alkyl, phenyl and halophenyl.

2. An organic radical compound as claimed in claim 1 in which $R^1$, $R^2$ and $R^3$ are phenyl and $R^4$ is hydrogen.

3. An organic radical compound as claimed in claim 1 in which $R^1$, $R^2$, $R^3$ and $R^4$ are phenyl.

4. An organic radical compound as claimed in claim 1 in which $R^1$, $R^2$ and $R^3$ are phenyl and $R^4$ is p-bromophenyl.

5. An organic radical compound as claimed in claim 1 in which $R^1$ and $R^2$ are phenyl, $R^3$ is o-methoxyphenyl and $R^4$ is hydrogen.

6. An organic radical compound as claimed in claim 1 in which $R^1$ and $R^2$ are o-methoxyphenyl, $R^3$ is phenyl and $R^4$ is hydrogen.

7. A process for the production of organic radical compounds as claimed in claim 1 which comprises reacting a formazan of the formula:

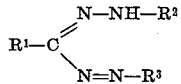

with an aldehyde of the formula:

8. A process as claimed in claim 7 wherein in place of the free aldehyde a functional derivative thereof is used, said functional derivative being selected from the group consisting of aldehyde hydrates and such derivatives in which the aldehyde oxygen is replaced by two halogen atoms and, in the case of formaldehyde, paraformaldehyde and 1,3,5 trioxane.

9. A process for the production of organic radical compounds as claimed in claim 1 wherein a formazan of the formula:

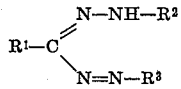

is reacted with a compound of the formula:

in which X is selected from the group consisting of sulfate, iodide and bromide, followed by dehydrogenation.

No references cited.

WALTER A. MODANCE, *Primary Examiner.*

JOHN D. RANDOLPH, *Examiner.*

R. T. BOND, *Assistant Examiner.*